United States Patent
Hara et al.

(10) Patent No.: US 11,921,065 B2
(45) Date of Patent: Mar. 5, 2024

(54) X-RAY FLUORESCENCE SPECTROMETER

(71) Applicant: RIGAKU CORPORATION, Akishima (JP)

(72) Inventors: Shinya Hara, Takatsuki (JP); Yasujiro Yamada, Takatsuki (JP); Kenji Kodama, Hiroshima (JP); Makoto Doi, Ibaraki (JP)

(73) Assignee: Rigaku Corporation, Tokyo (JP)

( * ) Notice: Subject to any disclaimer, the term of this patent is extended or adjusted under 35 U.S.C. 154(b) by 0 days.

(21) Appl. No.: 18/033,652

(22) PCT Filed: Sep. 10, 2021

(86) PCT No.: PCT/JP2021/033364
§ 371 (c)(1),
(2) Date: Jul. 10, 2023

(87) PCT Pub. No.: WO2022/091598
PCT Pub. Date: May 5, 2022

(65) Prior Publication Data
US 2023/0393084 A1 Dec. 7, 2023

(30) Foreign Application Priority Data

Oct. 30, 2020 (JP) .................................. 2020-182991

(51) Int. Cl.
*G01N 23/223* (2006.01)
(52) U.S. Cl.
CPC .................................. *G01N 23/223* (2013.01)
(58) Field of Classification Search
CPC ........... G01N 23/223; G01N 2223/076; G01N 23/2076; G01N 23/2209; G01N 23/22;
(Continued)

(56) References Cited

U.S. PATENT DOCUMENTS 6,668,038 B2  12/2003  Kataoka et al.
8,515,009 B1   8/2013  Piorek et al.
(Continued)

FOREIGN PATENT DOCUMENTS

CN    110530912 A    12/2019
JP    2003-107020 A   4/2003
(Continued)

OTHER PUBLICATIONS

International Preliminary Report of Patentability in application No. PCT/JP2021/033364 from the International Bureau dated May 11, 2023.
(Continued)

*Primary Examiner* — Don K Wong
(74) *Attorney, Agent, or Firm* — Sughrue Mion, PLLC

(57) ABSTRACT

An exclusion module (21) is configured to calculate a coating amount of each component whose measurement element is not contained in the base layers, for each of corresponding measurement lines, on an assumption that that component solely makes up the thin film and to adopt a maximum coating amount as an initial value of the coating amount of that component; and to calculate a coating amount of each component whose measurement element is contained in the base layers, for each of corresponding measurement lines, on the basis of initial values of coating amounts of individual components whose measurement elements are not contained in the base layers, if calculation results for all the corresponding measurement lines give errors, to exclude that component from analysis targets as an unquantifiable component, and in other cases, to adopt a maximum coating amount as an initial value of the coating amount of that component.

1 Claim, 2 Drawing Sheets

(58) Field of Classification Search
CPC ... G01N 23/2208; G01N 2223/61; C21C 1/04
See application file for complete search history.

(56) References Cited

U.S. PATENT DOCUMENTS

| | | |
|---|---|---|
| 10,012,605 B2 | 7/2018 | Yamada et al. |
| 2003/0118148 A1 | 6/2003 | Kataoka et al. |
| 2013/0202083 A1 | 8/2013 | Piorek et al. |
| 2013/0202084 A1 | 8/2013 | Piorek et al. |
| 2017/0322165 A1 | 11/2017 | Yamada et al. |

FOREIGN PATENT DOCUMENTS

| | | | | |
|---|---|---|---|---|
| JP | 2004-004102 A | 1/2004 | | |
| JP | 2006-071311 A | 3/2006 | | |
| JP | 2012-068084 A | 4/2012 | | |
| WO | 2017/026200 A1 | 2/2017 | | |
| WO | WO-2017038702 A1 * | 3/2017 | ........... | G01N 23/207 |

OTHER PUBLICATIONS

Decision to Grant a Patent for Japanese Patent Application No. 2020-182991 dated Nov. 22, 2022.
International Search Report for PCT/JP2021/033364 dated Nov. 16, 2021.

* cited by examiner

X-RAY FLUORESCENCE SPECTROMETER

CROSS REFERENCE TO THE RELATED APPLICATION

This application is a National Stage of International Application No. PCT/JP2021/033364, filed Sept. 10, 2021, claiming priority based on Japanese patent application No. 2020-182991, filed Oct. 30, 2020, the entire disclosure of which is herein incorporated by reference as a part of this application.

BACKGROUND OF THE INVENTION

Field of the Invention

The present invention relates to an X-ray fluorescence spectrometer which irradiates a sample with primary X-rays, the sample including a base layer and a single thin film formed on the base layer, the single thin film containing individual components with coating amounts to be measured and having a thickness to be measured, to determine quantitative values of the coating amounts of the individual components in the thin film and the thickness of the thin film on the basis of measured intensities of generated secondary X-rays by using the fundamental parameter method.

Description of Related Art

For example, Patent Document 1 describes an X-ray fluorescence spectrometer which irradiates a sample having a thin film with primary X-rays to determine quantitative values of a composition (coating amounts of the individual components) and a thickness of the thin film on the basis of measured intensities of generated secondary X-rays by using the fundamental parameter method (hereinafter, sometimes referred to as the FP method). As used herein, determining quantitative values of a composition and a thickness of a thin film on the basis of measured intensities by using the FP method is intended to mean (i) calculating theoretical intensities of the secondary X-rays (measurement lines) generated from the sample excited by the primary X-rays on the basis of an assumed composition of the thin film constituting the sample and then (ii) recalculating, by successive approximation, the assumed composition of the thin film such that the theoretical intensities coincide with converted measured intensities which are obtained by converting the measured intensities of the sample to a theoretical intensity scale to determine quantitative values of the composition and the thickness.

In general, when determining quantitative values of a composition of a bulk by using the FP method, contents (mass fractions) of individual components are used as values representing the composition, and intensities of measurement lines depend on the contents of corresponding components, so that the quantitative values of the composition of the bulk are determined, whereas a quantitative value of a thickness cannot be determined. In contrast, as for a thin film, coating amounts (masses per unit area) of individual components are used as values representing its composition, and intensities of measurement lines depend on the coating amounts of corresponding components, so that quantitative values of coating amounts of the individual components in the thin film and a thickness of the thin film are determined in an area where the intensities of the measurement lines change as the thickness of the thin film changes.

Related Document

Patent Document

[Patent Document 1] International Publication No. 2017/026200

SUMMARY OF THE INVENTION

In a case of a sample including a base layer and a thin film formed on the base layer, however, if intensities of measurement lines from the base layer lie outside the above area, assumed coating amounts of individual components cannot be updated during recalculation by successive approximation. Thus, the quantitative calculation cannot be continued and is ended with an error indication notifying as such, without determining quantitative values of the coating amounts of the individual components and the thickness.

In view of the conventional problem, an object of the present invention is to provide an X-ray fluorescence spectrometer which determines quantitative values of coating amounts of individual components in a thin film formed on a base layer and a thickness of the thin film by using the FP method, the spectrometer being capable of excluding, from analysis targets, a component which causes an error in quantitative calculation for the thin film due to the influence of intensities of measurement lines from the base layer as an unquantifiable component.

In order to achieve the above object, the present invention provides an X-ray fluorescence spectrometer configured to irradiate a sample with primary X-rays, the sample including one or more base layers containing individual components with known coating amounts or contents and a single thin film formed on the base layers, the single thin film containing individual components with coating amounts to be measured and having a thickness to be measured, to determine quantitative values of the coating amounts of the individual components in the thin film and the thickness of the thin film on the basis of measured intensities of generated secondary X-rays by using the fundamental parameter method, the X-ray fluorescence spectrometer including an exclusion module configured to exclude, from analysis targets, an unquantifiable component among components corresponding to measurement lines which are secondary X-rays having intensities to be measured, as preprocessing for quantitative calculation by the fundamental parameter method.

The exclusion module is configured: to first calculate a coating amount of each component whose measurement element is not contained in the base layers, for each of corresponding measurement lines, on an assumption that that component solely makes up the thin film and to adopt a maximum coating amount as an initial value of the coating amount of that component. The exclusion module is further configured to calculate a coating amount of each component whose measurement element is contained in the base layers, for each of corresponding measurement lines, on the basis of initial values of coating amounts of individual components whose measurement elements are not contained in the base layers, if calculation results for all the corresponding measurement lines give errors, to exclude that component from analysis targets as an unquantifiable component, and in other cases, to adopt a maximum coating amount as an initial value of the coating amount of that component.

In the X-ray fluorescence spectrometer according to the present invention, the exclusion module first estimates an initial value of a coating amount of each component whose measurement element is not contained in the base layers, calculates a coating amount of each component whose measurement element is contained in the base layers on the basis of initial values of the coating amounts of individual components whose measurement elements are not contained in the base layers, and determines whether or not the calculation results give errors, so that it is possible to properly exclude, from analysis targets, a component which gives errors in quantitative calculation for the thin film due to the influence of intensities of measurement lines from the base layers as an unquantifiable component.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like or corresponding parts throughout the several views. In the figures, FIG. 1 schematically shows an X-ray fluorescence spectrometer according to one embodiment of the present invention.

DESCRIPTION OF THE EMBODIMENTS

Figure 1:
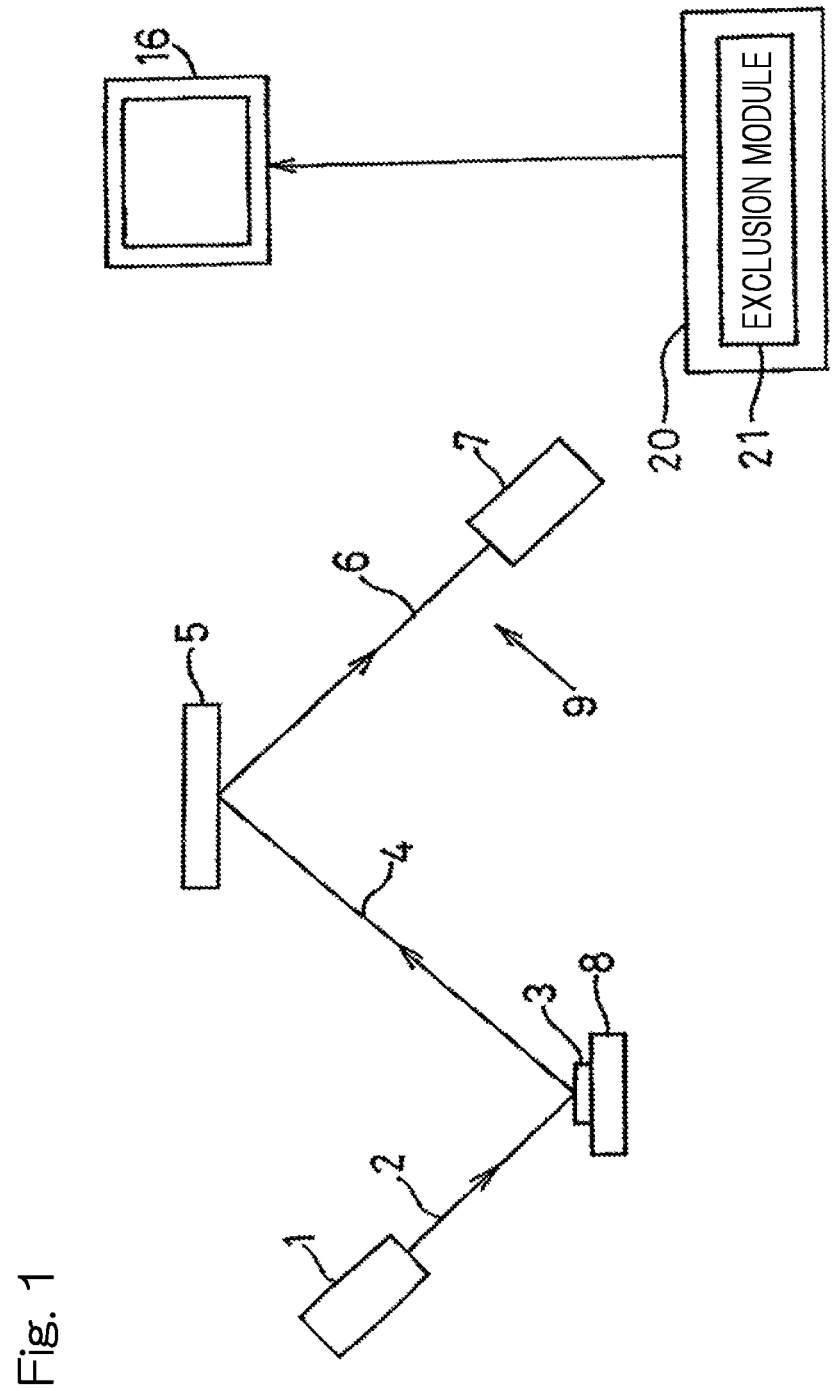

Hereinafter, a spectrometer according to one embodiment of the present invention will be described with reference to the drawings. As shown in FIG. 1, this is an X-ray fluorescence spectrometer which irradiates a sample 3 with primary X-rays 2 from an X-ray source 1 such as an X-ray tube, the sample including one or more base layers containing individual components with known coating amounts or contents and a single thin film formed on the base layers, the single thin film containing individual components with coating amounts to be measured and having a thickness to be measured, to measure intensities of generated secondary X-rays 4 using a detection module 9 and determine quantitative values of the coating amounts of the individual components in the thin film and the thickness of the thin film on the basis of the measured intensities by using the fundamental parameter method, and the X-ray fluorescence spectrometer includes an exclusion module which excludes, from analysis targets, an unquantifiable component among components corresponding to measurement lines which are secondary X-rays having intensities to be measured, as preprocessing for quantitative calculation by the fundamental parameter method.

The sample 3 herein is a so-called thin film sample, such as a sample including a thin film of indium tin oxide formed on a base layer constituted by a chrome-plated substrate, a sample including a galvalume-plated thin film formed on a base layer as a substrate, and a sample including a nickel-plated thin film formed on a base layer constituted by a Kovar substrate, and is placed on a sample stage 8. The detection module 9 includes: a spectroscopic device 5 that monochromates the secondary X-rays 4 such as fluorescent X-rays generated from the sample 3; and a detector 7 that measures an intensity of each of the monochromated secondary X-rays 6. A high energy-resolution detector may be used as a detection module, without using a spectroscopic device 5. The exclusion module 21 is included as a program in a quantification device 20 such as a computer.

As used herein, determining quantitative values of the coating amounts of the individual components in the thin film and the thickness of the thin film on the basis of measured intensities by using the FP method is intended to mean (i) calculating theoretical intensities of the secondary X-rays 4 generated from the sample 3 excited by the primary X-rays 2 on the basis of assumed coating amounts of the individual components in the single thin film of the sample 3 and then (ii) recalculating, by successive approximation, the assumed coating amounts of the individual components in the thin film such that the theoretical intensities coincide with converted measured intensities which are obtained by converting the measured intensities of the sample 3 to a theoretical intensity scale, with a predetermined convergence condition satisfied, to determine quantitative values of the coating amounts of the individual components and the thickness. The quantitative value of the thickness is determined on the basis of the quantitative values of the coating amounts of the individual components and densities of the individual components.

The exclusion module 21 first calculates a coating amount of each component whose measurement element is not contained in the base layers, for each of corresponding measurement lines, on an assumption that that component solely makes up the thin film and then adopts a maximum coating amount as an initial value of the coating amount of that component. The exclusion module 21 further calculates a coating amount of each component whose measurement element is contained in the base layers, for each of corresponding measurement lines, on the basis of initial values of coating amounts of individual components whose measurement elements are not contained in the base layers. If calculation results for all the corresponding measurement lines give errors, the exclusion module excludes that component from analysis targets as an unquantifiable component. In other cases, the exclusion module adopts a maximum coating amount as an initial value of the coating amount of that component. It should be noted that a measurement element of each component refer to an element which generate measurement lines corresponding to that component. Measurement lines corresponding to each component are not necessarily be lines of one series (one type), and lines of two or more series, such as K lines and L lines, can be set as measurement lines for a same measurement element.

Figure 2:
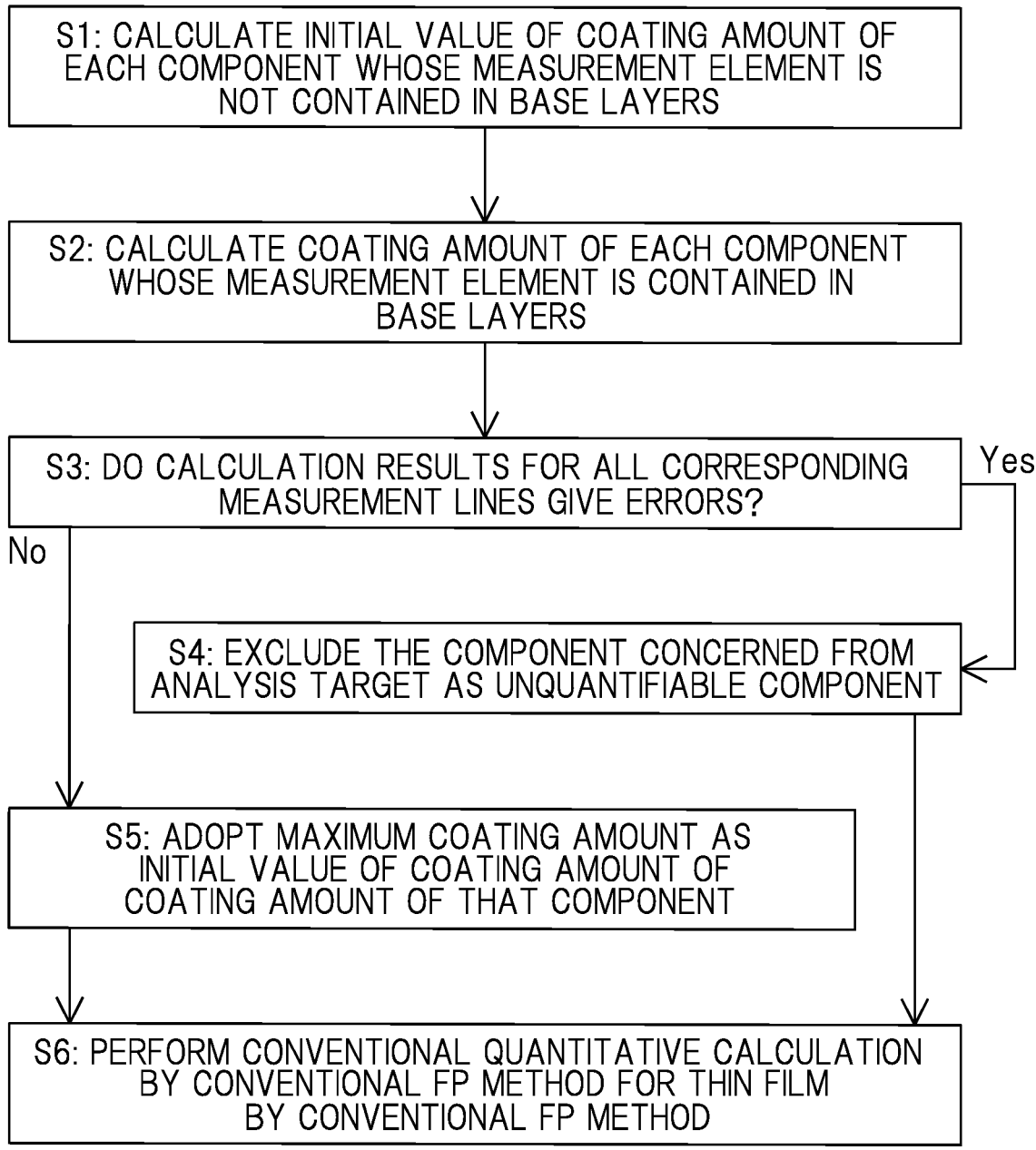
FIG. 2 is a flowchart showing operations of the X-ray fluorescence spectrometer.

In particular, the exclusion module 21 operates as shown in the flowchart of FIG. 2. Of the steps described below, step S1 to step S5 are operations performed by the exclusion module 21, and step S6 is a known FP method operation by the quantification device 20. It should be noted that although description is omitted, before step S1, there are also steps for obtaining measured intensities, converting them to a theoretical intensity scale to obtain converted measured intensities, and the like as known FP method operations.

First, in step S1, a coating amount of each component whose measurement element is not contained in the base layers is calculated for each of corresponding measurement lines, i.e., for each series in a case where there are multiple series of measurement lines corresponding to that component, on an assumption that that component solely makes up the thin film, and a maximum coating amount among the coating amounts calculated for that component is adopted as an initial value of the coating amount of that component. More specifically, the assumption that that component solely makes up the thin film is intended to mean that the effects of absorption and excitation of X-rays due to other coexisting components (hereinafter, referred to as coexisting components) are not taken into consideration, that is, so-called matrix correction is not performed. This is a commonly used technique in calculation of initial values in the FP method. The operation in step S1 is carried out for all components whose measurement elements are not contained in the base layers.

Next, in step S2, a coating amount of each component whose measurement element is contained in the base layers is calculated for each of corresponding measurement lines on the basis of initial values of coating amounts of individual components whose measurement elements are not contained in the base layers. More specifically, assuming that coexisting components exclusively include all components whose initial values of the coating amounts are calculated in step S1, a coating amount of each component whose measurement element is contained in the base layers is quantitatively calculated by using the FP method, for each series if there are multiple series of corresponding measurement lines. In doing so, the coating amounts of the coexisting components are fixed to the initial values of the coating amounts calculated in step S1, and so-called matrix correction is performed to take account of the effects of absorption and excitation of X-rays due to the coexisting components.

Next, in step S3, it is determined whether or not calculation results for all the corresponding measurement lines give errors. More specifically, it is determined whether or not calculation results in step S2 give errors for every component whose measurement element is contained in the base layers and for every corresponding measurement line of all series. If the determination is Yes, the process proceeds to step S4. If No, the process proceeds to step S5.

In step S4, the component concerned is excluded from the analysis target as an unquantifiable component. In step S5, on the other hand, a maximum coating amount among the coating amounts of that component calculated in step S2 is adopted as an initial value of the coating amount of that component.

After the operations of step S2 to step S4 or step S5 are carried out for all components whose measurement elements are contained in the base layers, the process proceeds to step S6 to calculate quantitative values of the coating amounts of the individual components and the thickness by conventional quantitative calculation by FP method for thin film. In this operation, only the components for which the initial values of the coating amounts are calculated in step S1 or step S5 are considered as analysis targets, and only the measurement lines of corresponding series to these components are set as measurement lines. The initial values of the coating amounts of the individual components calculated in step S1 or step S5 can be directly used as the initial values of the coating amounts of the individual components in the quantitative calculation in step S6. When the results of the quantitative calculation in step S6 are displayed on a display unit 16 such as a liquid-crystal display, it is also indicated that quantitative calculation cannot be made for the component(s) excluded from the analysis targets in step S4.

As described above, in the X-ray fluorescence spectrometer according to the present embodiment, the exclusion module 21 first estimates an initial value of a coating amount of each component whose measurement element is not contained in the base layers, calculates a coating amount of each component whose measurement element is contained in the base layers on the basis of initial values of the coating amounts of the individual components whose measurement elements are not contained in the base layers, and determines whether or not the calculation results give errors, so that it is possible to properly exclude, from analysis targets, a component which gives errors in quantitative calculation for the thin film due to the influence of intensities of measurement lines from the base layers as an unquantifiable component.

Although the present invention has been described in terms of the preferred examples thereof with reference to the drawings, those skilled in the art would readily arrive at various changes and modifications in view of the present specification without departing from the scope of the invention. Accordingly, such changes and modifications are included within the scope of the present invention defined by the appended claims.

REFERENCE NUMERALS 2 primary X-rays
3 sample
4 secondary X-rays (measurement lines)
21 exclusion module

What is claimed is:

1. An X-ray fluorescence spectrometer configured to irradiate a sample with primary X-rays, the sample including one or more base layers containing individual components with known coating amounts or contents and a single thin film formed on the one or more base layers, the single thin film containing individual components with coating amounts to be measured and having a thickness to be measured, to determine quantitative values of the coating amounts of the individual components in the thin film and the thickness of the thin film on the basis of measured intensities of generated secondary X-rays by using the fundamental parameter method, the X-ray fluorescence spectrometer comprising:

an exclusion module configured to exclude, from analysis targets, any unquantifiable component among components corresponding to measurement lines which are secondary X-rays having intensities to be measured, as preprocessing for quantitative calculation by the fundamental parameter method, wherein the exclusion module is configured:

to calculate a coating amount of each component whose measurement element is not contained in the base layers, for each of corresponding measurement lines, on an assumption that that component solely makes up the thin film and to adopt a maximum coating amount as an initial value of the coating amount of that component; and to calculate a coating amount of each component whose measurement element is contained in the base layers, for each of corresponding measurement lines, on the basis of initial values of coating amounts of individual components whose measurement elements are not contained in the base layers, such that if quantitative calculation cannot be continued and is ended without determining quantitative values of the coating amount of that component whose measurement element is contained in the base layers and the thickness for all the corresponding measurement lines of that component, that is excluded component from analysis targets as an unquantifiable component, and in other cases, to adopt a maximum coating amount as an initial value of the coating amount of that component.

* * * * *